(12) United States Patent
Titley

(10) Patent No.: US 9,416,330 B2
(45) Date of Patent: Aug. 16, 2016

(54) METHOD AND SYSTEM FOR REDUCING OXIDATION OF GLYCOL IN FLUID HANDLING SYSTEMS

(71) Applicant: Andrew Mark Titley, Rossmoyne (AU)

(72) Inventor: Andrew Mark Titley, Rossmoyne (AU)

(73) Assignee: Chevron U.S.A. Inc., San Ramon, CA (US)

( * ) Notice: Subject to any disclaimer, the term of this patent is extended or adjusted under 35 U.S.C. 154(b) by 108 days.

(21) Appl. No.: 14/334,826

(22) Filed: Jul. 18, 2014

(65) Prior Publication Data

US 2016/0018046 A1   Jan. 21, 2016

(51) Int. Cl.
| | | |
|---|---|---|
| *C09K 8/52* | (2006.01) | |
| *C10M 103/00* | (2006.01) | |
| *C23F 11/10* | (2006.01) | |
| *F17C 1/00* | (2006.01) | |
| *E21B 37/06* | (2006.01) | |

(52) U.S. Cl.
CPC .................. *C10M 3/00* (2013.01); *C23F 11/10* (2013.01); *E21B 37/06* (2013.01); *F17C 1/00* (2013.01)

(58) Field of Classification Search
None
See application file for complete search history.

(56) References Cited

U.S. PATENT DOCUMENTS

| | | | | |
|---|---|---|---|---|
| 2005/0161631 A1* | 7/2005 | Walker | ...................... | C10L 3/06 252/70 |
| 2009/0221451 A1* | 9/2009 | Talley | ...................... | C09K 8/52 507/90 |
| 2011/0319682 A1* | 12/2011 | Kang | ................... | C07D 207/06 585/3 |
| 2012/0018293 A1* | 1/2012 | Kaasa | ...................... | C09K 8/52 203/18 |
| 2013/0112923 A1* | 5/2013 | Kang | ...................... | C10L 3/107 252/400.41 |

\* cited by examiner

*Primary Examiner* — John J Figueroa
(74) *Attorney, Agent, or Firm* — Karen R. DiDomenicis

(57) ABSTRACT

Disclosed are methods and systems for reducing the risk of oxidation of hydrate inhibitors such as monoethylene glycol used to prevent the formation of hydrates in fluid handling systems including flow lines and pipelines. A hydrate inhibitor storage tank in fluid communication with the fluid handling system is used to hold a volume of liquid hydrate inhibitor, a volume of blanket gas and a layer of a liquid, nonflammable at operating conditions, therebetween. The liquid is immiscible with glycol.

20 Claims, 3 Drawing Sheets

METHOD AND SYSTEM FOR REDUCING OXIDATION OF GLYCOL IN FLUID HANDLING SYSTEMS

FIELD

The present disclosure relates to methods and systems for inhibiting the formation of natural gas hydrates in fluid handling systems that convey natural gas.

BACKGROUND

Glycols and methanol are commonly used to inhibit the formation of natural gas clathrate hydrates in pipelines and flow lines in fluid handling systems which convey fluids containing natural gas from oil and gas production sites to oil and gas processing facilities. Glycol is also known as monoethylene glycol, MEG, ethylene glycol, ethylene alcohol, ethane-1,2-diol, and 1,2-ethanediol. Such hydrates are formed from hydrocarbon gases such as methane in the presence of free water at high pressures and low temperatures. Hydrates can accumulate to block pipelines and flow lines, thus impeding production.

In many circumstances, glycol is preferred as a hydrate inhibitor over methanol as glycol has lower flammability risk and is easy to recover and reuse. However, the recovery of glycol introduces potential for exposure to air and specifically to oxygen. Oxygen contamination in glycol systems increases corrosion risk in pipelines, flow lines and other exposed equipment. These risks increase as glycols oxidize and decompose to form organic acids, particularly at higher temperatures. The presence of oxygen can interfere with corrosion inhibitors, exacerbate corrosion rates of iron and many other metals by methods including carbon dioxide and hydrogen sulfide corrosion mechanisms, and encourage aerobic bacteria to grow which can further promote pitting of equipment.

One known method for managing these risks is to use nitrogen or a blanket of dry hydrocarbon gas to exclude oxygen from glycol storage tanks, sumps and other sources of oxygen ingress. The use of nitrogen as a blanket gas has not been effective to eliminate oxygen, as low-grade nitrogen can have an oxygen content of between 3 and 5 vol %. Even high purity nitrogen produced by the cryogenic distillation of air can have an oxygen content of up to 10 ppm. The use of a hydrocarbon blanket gas can be more effective at eliminating oxygen, but introduces flammability and explosion risks.

Another known method for managing these risks is to use chemicals such as oxygen scavengers and oxidation inhibitors. However, such methods have been developed based on pure water systems which raise concerns regarding efficacy in the presence of glycol due to reaction kinetics.

It would be desirable to maintain an oxygen content in the process stream of less than 20 ppb to avoid problems with corrosion, pitting, cracking and the like. Such a low level has been difficult to achieve, monitor and enforce.

SUMMARY

In one aspect, a method is provided for reducing the risk of oxidation of glycol in fluid handling systems that use glycol as a hydrate inhibitor. The method includes providing a tank in fluid communication with the fluid handling system for storing a hydrate inhibitor comprising glycol; and providing a layer of a liquid in direct contact with a surface of the hydrate inhibitor in the tank wherein the liquid is immiscible with glycol and is nonflammable at operating conditions.

In another aspect, a system is provided which includes a tank in fluid communication with a fluid handling system for storing a volume of hydrate inhibitor comprising glycol; and a layer of liquid in direct contact with the volume of hydrate inhibitor in the tank wherein the liquid is immiscible with glycol and is nonflammable at operating conditions.

DESCRIPTION OF THE DRAWINGS

These and other objects, features and advantages of the present invention will become better understood with reference to the following description, appended claims and accompanying drawings where:

DETAILED DESCRIPTION

Figure 1:
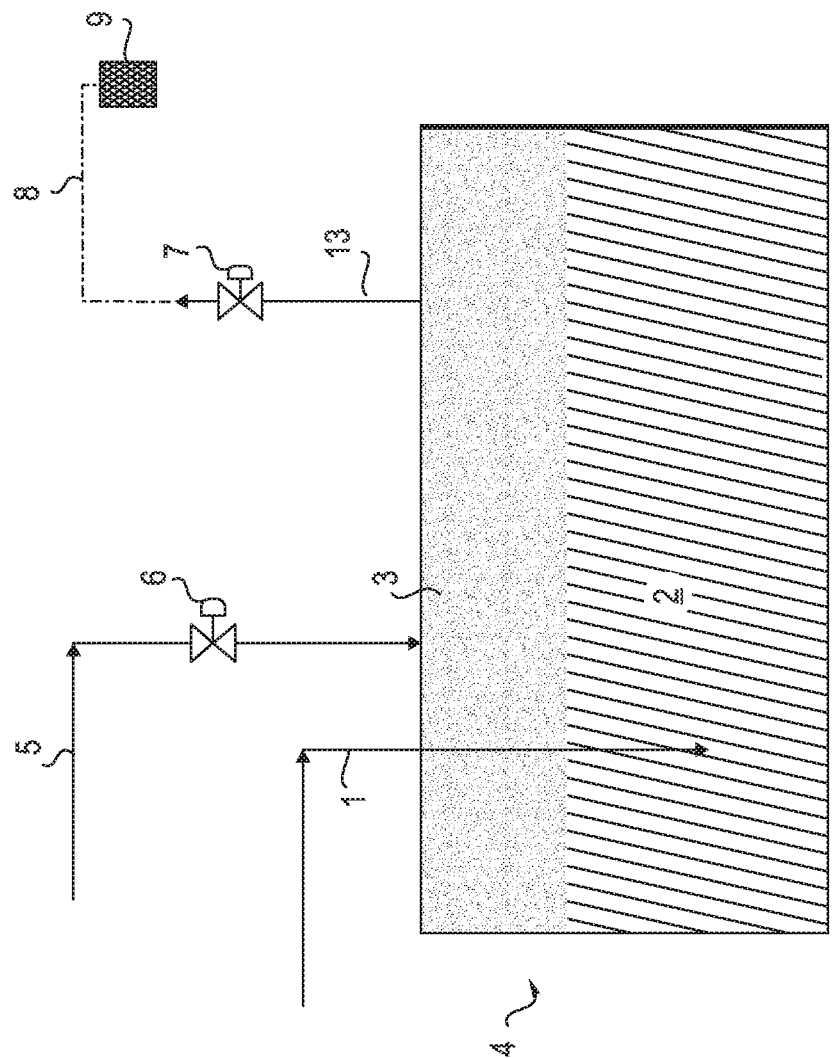
FIG. 1 is a simplified view of a prior art system.
Figure 2:
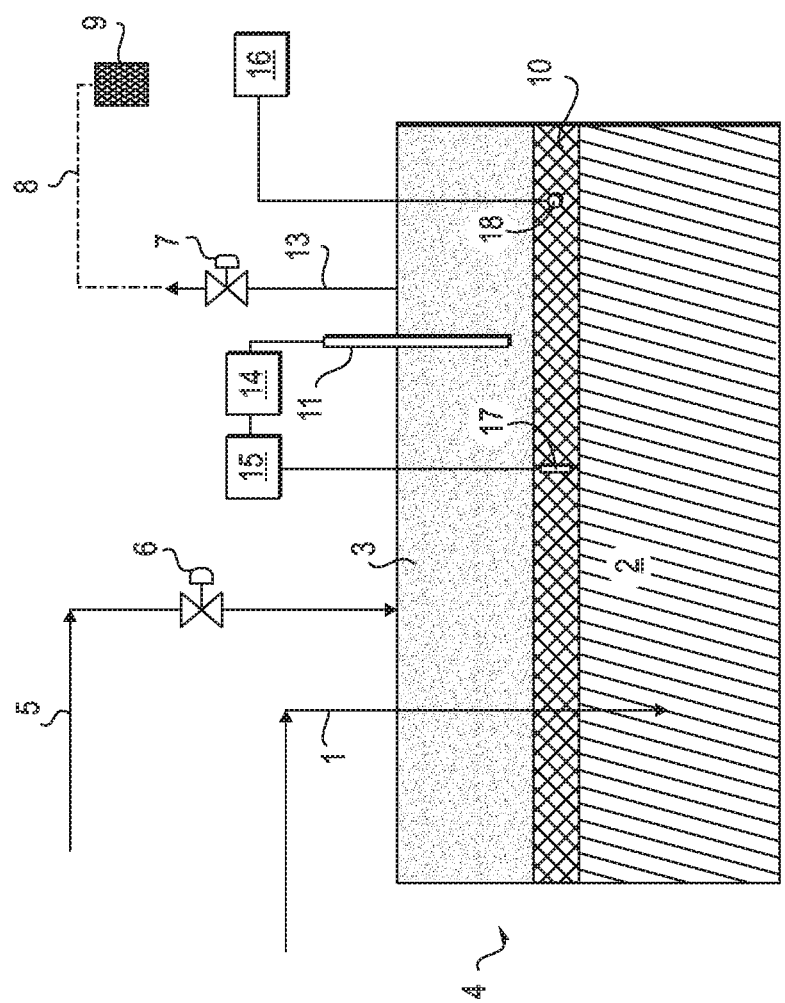
FIG. 2 is a simplified view of a system according to one exemplary embodiment.

FIG. 1 is a simplified view of a prior art system in which glycol 2, also referred to interchangeably as hydrate inhibitor, monoethylene glycol, MEG, aqueous solution or aqueous glycol solution, is stored as a volume of liquid in a tank 4. The tank 4 operates at atmospheric pressure. The MEG 2 can be fed into the tank 4 from a source of hydrate inhibitor (not shown) through hydrate inhibitor conduit 1. The MEG 2 can be stored at atmospheric pressure. Above the volume of MEG 2, an upper space in the tank 4 contains a volume of blanket gas 3. Blanket gas 3 can be fed into the tank 4 from a source of the blanket gas (not shown) through a blanket gas inlet conduit 5. The tank 4 allows blanket gas 3 to pass in and out of the tank 4 in order to prevent failure of the tank 4 due to either overpressure or vacuum as the liquid level changes. As MEG 2 enters and leaves the tank 4, the level of MEG 2 rises and falls. As the MEG level rises, valve 7 opens to allow the blanket gas 3 to leave the tank 4. Upon leaving the tank 4, the blanket gas 3 is directed to a vent 8 and a flame arrestor 9. A blanket gas inlet valve 6 in the blanket gas inlet conduit 5 can be provided to control the introduction or flow of blanket gas 3 into the tank 4 as the volume of hydrate inhibitor in the tank decreases. A blanket gas outlet valve 7 in the blanket gas outlet conduit 13 can control the exit flow of blanket gas 3 from the tank 4 as the volume of hydrate inhibitor 2 in the tank 4 increases. A blanket gas outlet conduit 13 can connect the blanket gas 3 in the tank 4 with a vent 8 and a flame arrestor 9. The vent 8 routes the blanket gas 3 to a safe location. The flame arrestor 9 is provided to prevent ignition of the blanket gas 3.

In one embodiment, a volume of liquid hydrate inhibitor is stored in a tank in fluid communication with a fluid handling system which conveys fluids containing natural gas from oil and gas production sites to gas processing facilities. The concentration of the glycol solution used depends on particular operating conditions, particularly ambient seabed temperature. Glycol solution at too high a concentration will become very viscous at low temperature and thus too difficult to pump. In one embodiment, the hydrate inhibitor is an aqueous solution containing from 15 to 95 vol % glycol. The MEG used for hydrate inhibition is typically referred to as "lean MEG" and typically contains from 70 to 90 wt % glycol to meet viscosity and freezing point limits. The returning MEG is referred to as "rich MEG" and due to uncertainties in predicting water content, e.g., injection when no or little water is actually present, such as during start-up, the concentration can vary significantly. In one embodiment, the hydrate inhibitor is a returning MEG having been used for hydrate inhibition containing from 15 to 95 vol % glycol, even from 15 to 20 vol % glycol.

In one embodiment, between and in direct contact with both the volume of blanket gas 3 and the volume of liquid MEG 2 is disposed a immiscible liquid layer 10 also referred to as a layer of a nonflammable liquid 10. The immiscible liquid is immiscible with glycol. The immiscible liquid is suitably a nonflammable liquid at operating conditions, e.g., temperatures up to 65° C., even from −10° C. to 65° C. (minus 10° C. to plus 65° C.). The immiscible liquid layer 10 can be used in addition to or as an alternative to the use of nitrogen or dry hydrocarbon blanket gas. The immiscible liquid layer 10 advantageously reduces the risk of oxidation or degradation of the glycol 2 by inhibiting mass transfer of oxygen from the blanket gas 3 to the glycol 2.

In one embodiment, the layer of the liquid 10 has an equilibrium solubility for oxygen that is higher than the equilibrium solubility for oxygen of the aqueous glycol solution 2. As a result, the layer of the liquid 10 preferentially absorbs oxygen from the aqueous glycol solution 2, thus minimizing the oxygen content within the glycol 2. In this case, oxygen can move from the hydrate inhibitor 2 and/or the blanket gas 3 to the layer of liquid 10 at a sufficiently high mass transfer rate such that oxygen is absorbed by the liquid 10 preferentially over being absorbed by the hydrate inhibitor 2.

In an alternative embodiment, the layer of the nonflammable liquid 10 is nonflammable at operating conditions and has an equilibrium solubility for oxygen that is lower than the equilibrium solubility for oxygen of the aqueous glycol solution 2. In this case, the liquid 10 inhibits oxygen mass transfer to the aqueous glycol solution 2 because the liquid layer 10 does not absorb oxygen, or oxygen moves from the blanket gas 3 to the layer of liquid 10 at a sufficiently low mass transfer rate such that the liquid inhibits oxygen mass transfer to be glycol 2. Therefore contact between the glycol 2 and any oxygen present above the liquid layer 10 is minimized The immiscible liquid layer 10 can be provided by any suitable method. In one embodiment, as shown, the immiscible liquid is fed from a source of immiscible liquid (not shown) through a conduit 11 also referred to as a liquid conduit 11 to the layer of nonflammable liquid 10. The immiscible liquid layer 10 forms directly above and in contact with the MEG 2. There are numerous options; temporary tank, feed from the plant.

In one embodiment, a thickness detector 17 can be provided in a location such that the thickness detector can measure a thickness of the layer of liquid 10. The thickness detector 17 can utilize at least one of radar, bubbler and float technologies.

In one embodiment, a processor 15 can be provided in communication with the thickness detector 17 for receiving thickness information from the thickness detector 17 and comparing the thickness of the layer of nonflammable liquid 10 measured by the thickness detector 17 with a predetermined target thickness of the layer of liquid 10. Furthermore, a controller 14 can be provided in communication with the processor 15 for controlling the addition and removal of nonflammable liquid to or from the layer of liquid 10 in order to achieve the predetermined target thickness.

In one embodiment, a chemical composition analysis device 18 can be provided at a location such that the chemical composition analysis device 18 can detect the chemical composition of the layer of nonflammable liquid 10. In one embodiment, a processor 16 can be provided in communication with the chemical composition analysis device 18 for receiving chemical composition information from the chemical composition analysis device 18 and comparing the chemical composition of the layer of nonflammable liquid 10 with a predetermined desired chemical composition of the layer of liquid 10.

Figure 3:
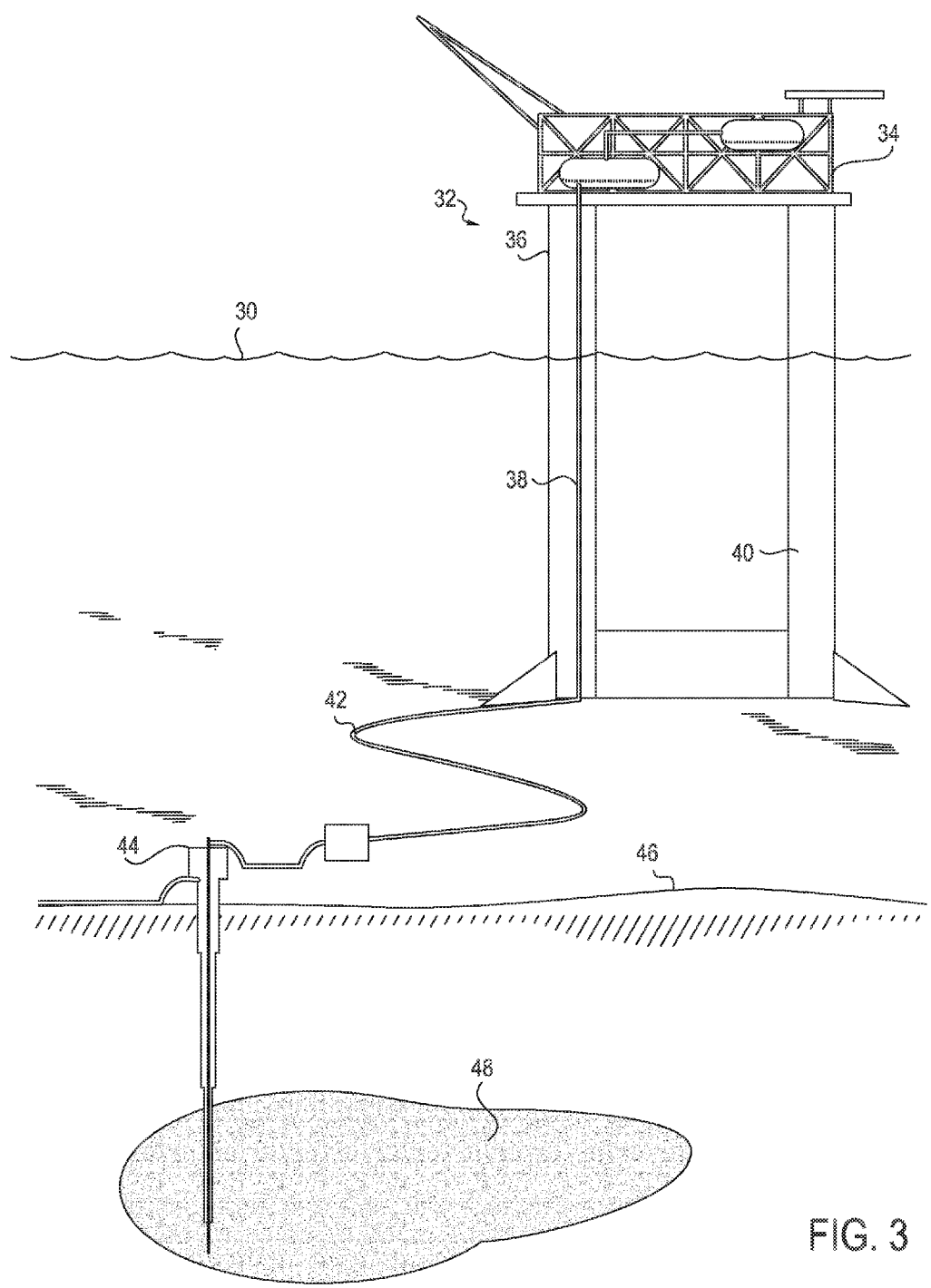
FIG. 3 is a simplified view of a system according to one exemplary embodiment.

In one embodiment, the tank can be located within the structure or legs of an offshore platform associated with offshore oil and gas production. In the system illustrated in FIG. 3, in one embodiment, an offshore platform 32 includes a topsides structure 34 and a substructure 40, also referred to herein as structure or legs 40, partially submerged beneath sea level 30. At least a portion of the structure or legs 40 may be used as the MEG tank 36. The system further includes at least a riser 38, a flowline 42 for injection of hydrate inhibitor, a wellhead 44 and a reservoir 48 beneath the earth's surface 46.

It should be noted that only the components relevant to the disclosure are shown in the figures, and that many other components normally part of a glycol unit are not shown for simplicity.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for reducing risk of oxidation of glycol in fluid handling systems using glycol as a hydrate inhibitor, comprising:
   a. providing a tank in fluid communication with the fluid handling system for storing a hydrate inhibitor comprising glycol; and
   b. providing a layer of a liquid in direct contact with a surface of the hydrate inhibitor in the tank wherein the liquid is nonflammable at operating conditions and is immiscible with glycol.

2. The method of claim 1, wherein the hydrate inhibitor comprises an aqueous solution comprising 15 to 90 vol % glycol.

3. The method of claim 1, wherein the hydrate inhibitor comprises a returned aqueous solution having been used for hydrate inhibition comprising an aqueous solution comprising 15 to 90 vol % glycol.

4. The method of claim 2, wherein the layer of the liquid has an equilibrium solubility for oxygen higher than an equilibrium solubility for oxygen of the aqueous solution such that the layer of the liquid preferentially absorbs oxygen from the aqueous solution.

5. The method of claim 2, wherein the layer of the liquid has an equilibrium solubility for oxygen lower than an equilibrium solubility for oxygen of the aqueous solution such that the liquid inhibits oxygen mass transfer to the aqueous solution.

6. The method of claim 1, further comprising providing a blanket gas in direct contact with the layer of liquid.

7. The method of claim 6, wherein oxygen moves from at least one of the hydrate inhibitor and the blanket gas to the liquid at a sufficiently high mass transfer rate such that oxygen is absorbed by the liquid preferentially over the hydrate inhibitor.

8. The method of claim 6, wherein the blanket gas comprises oxygen.

9. The method of claim 6, wherein oxygen moves from the blanket gas to the liquid at a sufficiently low mass transfer rate such that the liquid inhibits oxygen mass transfer to the aqueous solution.

10. The method of claim 1, wherein the operating conditions comprise temperatures from minus 10° C. to plus 65° C.

11. A system comprising:
  a. a tank in fluid communication with a fluid handling system for storing a volume of hydrate inhibitor comprising glycol;
  b. a layer of liquid in direct contact with the volume of hydrate inhibitor in the tank wherein the liquid is non-flammable at operating conditions and is immiscible with glycol;
  c. a layer of blanket gas in direct contact with the layer of liquid;
  d. a blanket gas inlet conduit connecting the layer of blanket gas with a source of the blanket gas;
  e. a blanket gas inlet valve in the blanket gas inlet conduit for controlling introduction of blanket gas into the tank as the volume of hydrate inhibitor in the tank decreases;
  f. a blanket gas outlet conduit connecting the layer of blanket gas with a vent; and
  g. a blanket gas outlet valve in the blanket gas outlet conduit for controlling exit of blanket gas from the tank as the volume of hydrate inhibitor in the tank increases.

12. The system of claim 11, further comprising a thickness detector located such that the thickness detector can measure a thickness of the layer of liquid.

13. The system of claim 12, wherein the thickness detector utilizes at least one of radar, bubbler and float technologies.

14. The system of claim 12, further comprising:
  a processor in communication with the thickness detector for receiving thickness information from the thickness detector and comparing the thickness of the layer of liquid measured by the thickness detector with a predetermined target thickness of the layer of liquid; and
  a controller in communication with the processor for controlling addition and removal of liquid to or from the layer of liquid to achieve the predetermined target thickness.

15. The system of claim 11, further comprising a chemical composition analysis device located such that the chemical composition analysis device can detect the chemical composition of the layer of liquid.

16. The system of claim 11, further comprising a nonflammable liquid conduit connecting the layer of liquid with a source of the liquid.

17. The system of claim 11, further comprising a hydrate inhibitor conduit connecting the volume of hydrate inhibitor in the tank with a source of the hydrate inhibitor.

18. The system of claim 11, wherein the tank is located within a leg of an offshore platform associated with offshore oil and gas production.

19. The system of claim 11, wherein the operating conditions comprise temperatures from minus 10° C. to plus 65° C.

20. The system of claim 11, wherein the blanket gas comprises oxygen.

* * * * *